United States Patent
Meschke et al.

(10) Patent No.: US 10,238,040 B2
(45) Date of Patent: Mar. 26, 2019

(54) HARVESTER LOUVER ROTATION

(71) Applicant: Deere and Company, Moline, IL (US)

(72) Inventors: Michael T. Meschke, Silvis, IL (US); Brian Herringshaw, Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 15/481,453

(22) Filed: Apr. 6, 2017

(65) Prior Publication Data

US 2018/0288940 A1   Oct. 11, 2018

(51) Int. Cl.
*A01F 12/44* (2006.01)
*A01D 41/06* (2006.01)

(52) U.S. Cl.
CPC .......... *A01F 12/448* (2013.01); *A01D 41/06* (2013.01)

(58) Field of Classification Search
CPC . A01D 75/282; A01D 41/1276; A01F 12/448; A01F 12/446; A01F 12/44
USPC ................... 460/101, 109; 209/394
See application file for complete search history.

(56) References Cited

U.S. PATENT DOCUMENTS

| | | | | |
|---|---|---|---|---|
| 2,362,099 A * | 11/1944 | Sargent | ............... | B07B 1/12 209/394 |
| 4,259,829 A * | 4/1981 | Strubbe | .............. | A01D 41/1276 460/1 |
| 4,531,528 A * | 7/1985 | Peters | ................... | A01F 12/44 460/97 |
| 4,712,568 A * | 12/1987 | Strong | ................. | A01F 12/448 209/394 |
| 4,863,415 A * | 9/1989 | Carnewal | ............... | A01F 12/44 209/234 |
| 5,466,190 A * | 11/1995 | Skinner | ................ | A01F 12/44 460/101 |
| 5,489,029 A * | 2/1996 | Jonckheere | ........... | A01F 12/448 209/352 |
| 6,468,154 B1 * | 10/2002 | Eggenhaus | .......... | A01F 12/448 460/101 |
| 6,953,397 B2 * | 10/2005 | Jonckheere | .......... | A01F 12/448 460/101 |
| 7,371,162 B2 * | 5/2008 | Matousek | ............ | A01F 12/448 460/101 |
| 7,497,775 B1 * | 3/2009 | Claerhout | ............ | A01F 12/446 460/101 |
| 7,566,266 B1 | 7/2009 | Ricketts | | |

(Continued)

FOREIGN PATENT DOCUMENTS

DE    19731236     1/1999
DE    29924755     10/2005
(Continued)

OTHER PUBLICATIONS

EP Search Report for Application No. 18173536.6-1006 dated Nov. 16, 2018.

*Primary Examiner* — Arpad Fabian-Kovacs
(74) *Attorney, Agent, or Firm* — Rathe Lindenbaum LLP (57) ABSTRACT

A harvester cleaning system may include a first cleaning zone extending in a first inclined plane and a second cleaning zone extending in a second inclined plane different than the first inclined plane. The first and second cleaning zones may include first and second sets of louvers. A single actuator is operably coupled to the first set of louvers and the second set of louvers to concurrently rotate both the first set of louvers and the second set of louvers.

19 Claims, 9 Drawing Sheets

(56) References Cited

U.S. PATENT DOCUMENTS

| | | | |
|---|---|---|---|
| 7,946,908 B2* | 5/2011 | Lobdell | A01D 75/282 209/394 |
| 9,149,002 B2* | 10/2015 | Bischoff | A01F 12/446 |
| 9,901,033 B1* | 2/2018 | Schoeny | A01F 12/448 |
| 2002/0128054 A1* | 9/2002 | Lauer | A01D 41/1276 460/101 |
| 2002/0183103 A1* | 12/2002 | Anderson | A01F 12/448 460/101 |
| 2003/0140612 A1 | 7/2003 | Gorden | |
| 2010/0113113 A1* | 5/2010 | Ricketts | A01F 12/448 460/101 |
| 2014/0128133 A1* | 5/2014 | Claerhout | A01F 12/446 460/101 |
| 2017/0142904 A1* | 5/2017 | Missotten | A01F 12/448 |
| 2018/0103589 A1* | 4/2018 | Meschke | A01F 12/444 |

FOREIGN PATENT DOCUMENTS

| | | | | |
|---|---|---|---|---|
| DE | 102013103102 | | 10/2014 | |
| JP | 2004065247 A | * | 3/2004 | A01F 12/32 |
| RU | 2041597 | | 8/1995 | |
| RU | 2439872 | | 1/2012 | |
| SU | 1464957 | | 3/1989 | |

\* cited by examiner

HARVESTER LOUVER ROTATION

BACKGROUND

Harvesters are utilized to gather crops from a growing medium. Such harvesters further thresh and clean the gathered crop. To clean the gathered crop, many harvesters include louvers, wherein separated grain falls through spaces between the louvers. Such louvers are sometimes rotated between different angular positions to accommodate different harvesting conditions.

DETAILED DESCRIPTION OF EXAMPLES

Some harvesters have cleaning systems that utilize sets of louvers arranged in different inclined planes. With such harvesters, the different sets of louvers in the different inclined planes are actuated or rotated using dedicated actuators. The dedicated actuators increase the complexity and cost of the harvester cleaning system.

Disclosed herein is an example method and harvester cleaning system that rotates different sets of louvers on different inclined planes with a single actuator. Example methods and harvester cleaning systems operably link different sets of louvers on different inclined planes so rotation of one set of louvers on a first inclined plane automatically results in rotation of another set of louvers on a second inclined plane. The linking of such louvers on different inclined planes and the selective angular adjustment of both sets of louvers on both inclined planes using a single actuator or through a single actuation of the single actuator may reduce the complexity and cost of the harvester cleaning system.

Disclosed herein is an example harvester cleaning system that may include a first cleaning zone extending in a first inclined plane and a second cleaning zone extending in a second inclined plane different than the first inclined plane. The first and second cleaning zones may include first and second sets of louvers. A single actuator is operably coupled to the first set of louvers and the second set of louvers to concurrently rotate both the first set of louvers and the second set of louvers. In some implementations, the harvester cleaning system may comprise more than two cleaning zones extending in three or more inclined planes, wherein a single actuator may concurrently rotate sets of louvers in each of the inclined planes.

Disclosed herein is an example method for controlling the rotation and angular positioning of louvers in a harvester cleaning system. The method may include moving an output member of an actuator, transmitting motion of the output member to a first set of louvers supported in a first cleaning zone of a harvester along a first inclined plane to rotate the first set of louvers and transmitting the motion of the output member to a second set of louvers supported in a second cleaning zone of the harvester along a second inclined plane, different than the first inclined plane, to rotate the second set of louvers. In some implementations, the harvester cleaning system may comprise more than two cleaning zones extending in three or more inclined planes, wherein a single actuator may concurrently rotate sets of louvers in each of the inclined planes.

Disclosed herein is an example harvester. The harvester may include a head to separate crop from a growing medium, a threshing mechanism to thresh the crop and a cleaning shoe to clean the threshed crop. The cleaning shoe may include a first cleaning zone extending in a first inclined plane and a second cleaning zone extending in a second inclined plane different than the first inclined plane, a reciprocating drive, first and second sets of louver wires, at least one adjustment arm and a linear actuator. The first and second cleaning zones comprise first and second sets of louvers, respectively. The reciprocating drive is to reciprocate the first cleaning zone with the first set of louvers and the second cleaning zone with the second set of louvers. The at least one adjustment arm may include slots receiving the first set of louver wires and the second set of louvers. The linear actuator is operably coupled to the at least one adjustment arm, wherein the linear actuator concurrently moves the at least one adjustment arm to concurrently rotate the first set of louver wires and the second set of louver wires to concurrently rotate the first set of louvers and the second set of louvers.

Figure 1:
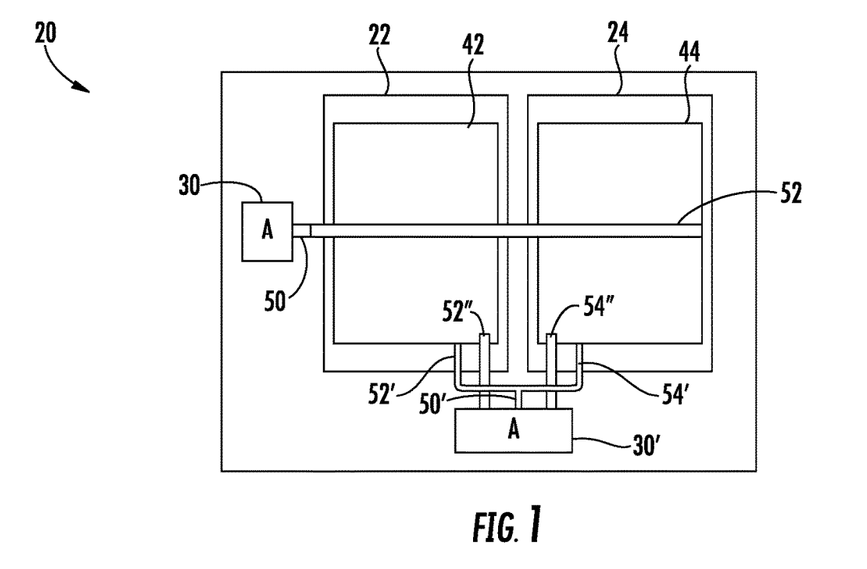
FIG. 1 is a schematic diagram illustrating a top of an example harvester cleaning system.
Figure 2:
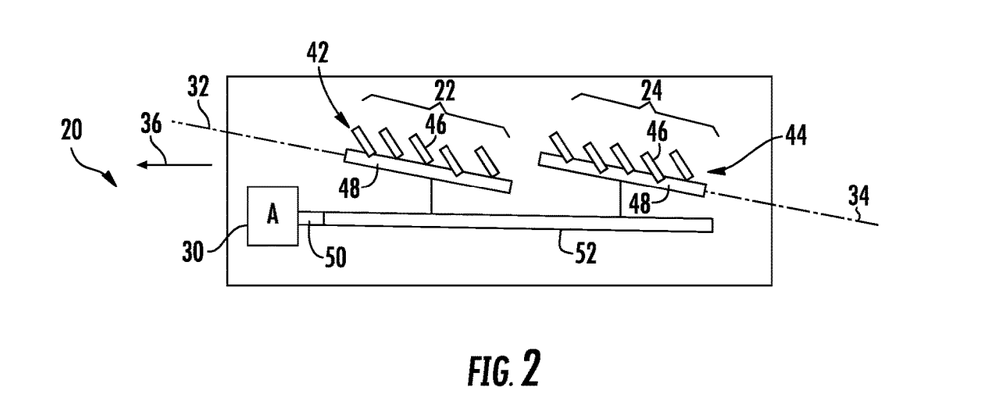
FIG. 2 is a schematic diagram of a side of the example harvester cleaning system of FIG. 1 with louvers in different inclined planes in a first angular position.

FIGS. 1 and 2 schematically illustrate an example harvester cleaning system 20 for a harvester. Harvester cleaning system 20 rotates different sets of louvers on different inclined planes with a single actuator. The example harvester cleaning system 20 operably links different sets of louvers on different inclined planes so rotation of one set of louvers on a first inclined plane automatically results in another set of louvers on a second inclined plane. The linking of such louvers are different inclined planes and the selective angular adjustment of both sets of louvers on both inclined planes using a single actuator or through a single actuation of the single actuator reduces the complexity and cost of the harvester cleaning system.

Harvester cleaning system 20 comprises cleaning zones 22, 24 and actuator 30. Cleaning zones 22 and 24 extend within different inclined planes 32 and 34, respectively. Inclined planes 32 and 34 are each angled regarding a horizontal plane. In the example illustrated, planes 32 and 34 are inclined in a rearward direction as indicated by arrow 36, inclined towards the rear of the harvester in the direction which air is blown through and across cleaning zones 22, 24. In the example illustrated, planes 32 and 34 are parallel to one another. In other implementations, planes 32 and 34 may have different slopes or inclinations regarding one another regarding the horizontal plane.

As further shown by FIG. 2, zones 22 and 24 comprise different sets 42 and 44 of louvers 46. Louvers 46 are rotatably supported by bars, wires or other structures 48 (schematically illustrated) that are contained and reside in planes 32, 34. In one implementation, louvers 46 are supported by wires (shown and described with respect to other implementations), wherein the wires are rotatably supported by supports and rotate to pivot the louvers 46. Rotation of louvers 46 adjusts the gaps between louvers 46 to accommodate changes in harvesting conditions. Although the schematic illustration of system 20 illustrates each cleaning zone 22, 24 as having five louvers 46 rotatably supported by a base 48, it should be appreciated that each of such zones 22, 24 may include a greater number of such louvers rotatable between different angular positions relative to base 48 and relative to the respective planes 32, 34 of zones 22, 24.

Actuator 30 is operably coupled to sets 42 and 44 of louvers 46 to concurrently rotate the louvers 46 of both sets 42 and 44. For this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or may be removable or releasable in nature. The term "operably coupled" shall mean that two members are directly or indirectly joined so motion may be transmitted from one member to the other member directly or via intermediate members.

In the example illustrated, actuator 30 has a single output member 50, the motion of which is concurrently transmitted to both sets 42 and 44 of louvers 46 to rotate both sets 42 and 44 of louvers 46. In one implementation, output member 50 of actuator 30 is operably coupled to sets 42 and 44 by a single linkage or by series of connected linkages that continuously extends into direct connection with both of sets 42 and 44. In another implementation, output member 50 of actuator 30 is connected to the set 42 of louvers 46, wherein the set 42 of louvers 46 is itself operably coupled to set 44 of louvers 46 so motion or movement of output member 50 results in movement or rotation of set 42 of louvers 46 and wherein movement or rotation of set 42 of louvers 46 is automatically transmitted to set 44 of louvers 46. Set 42 of louvers 46 itself serves as a functional linkage and an intermediate force transmitting mechanism operably coupling output member 50 to set 44 of louvers 46.

In the example illustrated, output member 50 is connected to sets 42 and 44 of louvers 46 by a single force transmitting linkage or a series of interconnected linkages 52 that extends across set 42 into connection with set 44. In another implementation, as indicated by broken lines, system 20 may alternatively comprise an actuator 30' having an output member 50' that is connected to two branch links 52, 54 extending into connection with their respective associated sets 22, 24 of louvers 46. In such an implementation, the alternative location of actuator 30' and the use of branch links 52', 54', forming a T-shaped connection, facilitates the concurrent adjustment and rotation of louvers 46 of sets 42 and 44 without such linkages or links extending completely across or along the entire length of set 22 of louvers 46.

In still another implementation, as indicated by broken lines, the actuator 30' may be directly connected to both of sets 42 and 44 of louvers 46 by individual, separate force transmitting links 52" and 54", respectively. For example, in one implementation, links 52" and 54" may be connected to one another by intermediate gearing or other force transmitting and connection members such that actuator 30' may output a single force or torque from a single output that is concurrently transmitted to both of links 52" and 54". In each of such cases, a single actuator 30, 30' concurrently pivots or rotates louvers 46 of both sets 42 and 44. The degree to which louvers 46 of both sets 42 and 44 rotate is proportional to the extent of the single instance of movement of output member 50 of actuator 30.

In one implementation, actuator 30 comprises a linear actuator, such as a hydraulic or pneumatic cylinder-piston assembly or an electric solenoid. In such an implementation, the linear actuator provided by actuator 30 linearly reciprocates linkage 52, which is operably coupled to the louvers 46, to transmit force or motion to both sets 42 and 44 of louvers 46 to rotate all of such louvers 46 to adjust their angular orientations. In yet another implementation, the linear actuator provided by actuator 30 linearly reciprocates set 42 of louvers 46, wherein the linear motion provided by actuator 30 is further transmitted by the first cleaning zone 22 to the second cleaning zone 24 to rotate louvers 46 of set 44. In yet other implementations, actuator 30 may comprise a rotational actuator, such as a motor, wherein the rotational movement is transmitted and possibly converted to linear movement, to concurrently rotate louvers 46 of both sets 42 and 44 in the different zones 22, 24, respectively.

Figure 3:
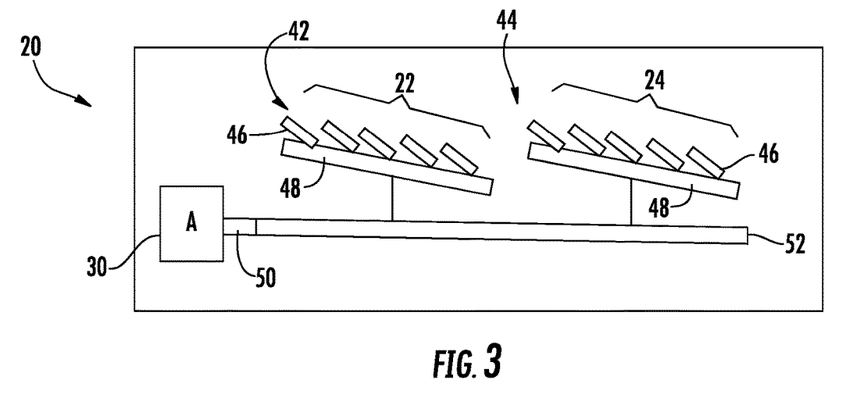
FIG. 3 is a schematic diagram of the side of the example harvester cleaning system of FIG. 1 with the louvers in a second angular position different than the first angular position.

FIG. 3 illustrates cleaning system 20 following a single actuation of actuator 30. FIG. 3 illustrates louvers 46 of both sets 42 and 44 being rotated to a different angular orientation or position as compared to that shown in FIG. 2. In the example illustrated, movement of output member 50 of actuator 30 by a given distance or extent results in the louvers 46 of both sets 42 and 44 being rotated by equal angular extents so louvers 46 of sets 42 and 44 are at the same angular orientation after the adjustment shown in FIG. 3.

Figure 4:
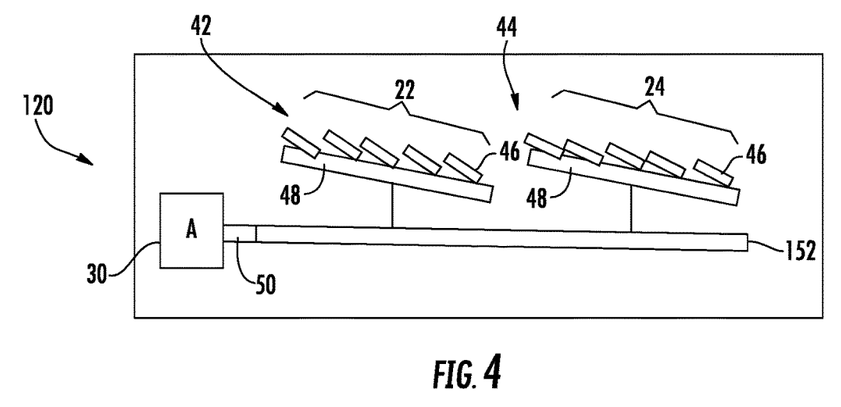
FIG. 4 is a schematic diagram of the side of the example harvester cleaning system of FIG. 1, illustrating louvers of different cleaning zones being differently rotated in response to motion of an actuator.

FIG. 4 schematically illustrates harvester cleaning system 120, another example implementation of harvester cleaning system 20. Harvester cleaning system 120 is similar to harvester cleaning system 20 except that harvester cleaning system 120 comprises a linkage 152, instead of linkage 52, 52', 54', 52" or 54". Linkage 152 is formed from at least one force transmitting member configured so the extent of movement or motion transmitted to set 44 of louvers 46 differs from the extent of movement or motion transmitted to set 42 of louvers 46 for a given single extent of movement of output member 50 of actuator 30. For example, in one implementation in which actuator 30 comprises a linear actuator which linearly shifts or moves output member 50 in one direction or the other, movement of a member 50 by a given distance rotates louvers 46 of set 42 by a first angular extent, but rotate louvers 46 of set 44 by a second angular extent different than the first angular extent. Although the rotation of the louvers 46 is proportional to the extent of movement of output member 50 by actuator 30, such proportional rotations are different. The ratio between the resulting extent of rotation of louvers 46 for the different sets 42, 44 regarding a given extent of movement of output member 50 is different for sets 42 and 44.

Figure 5:
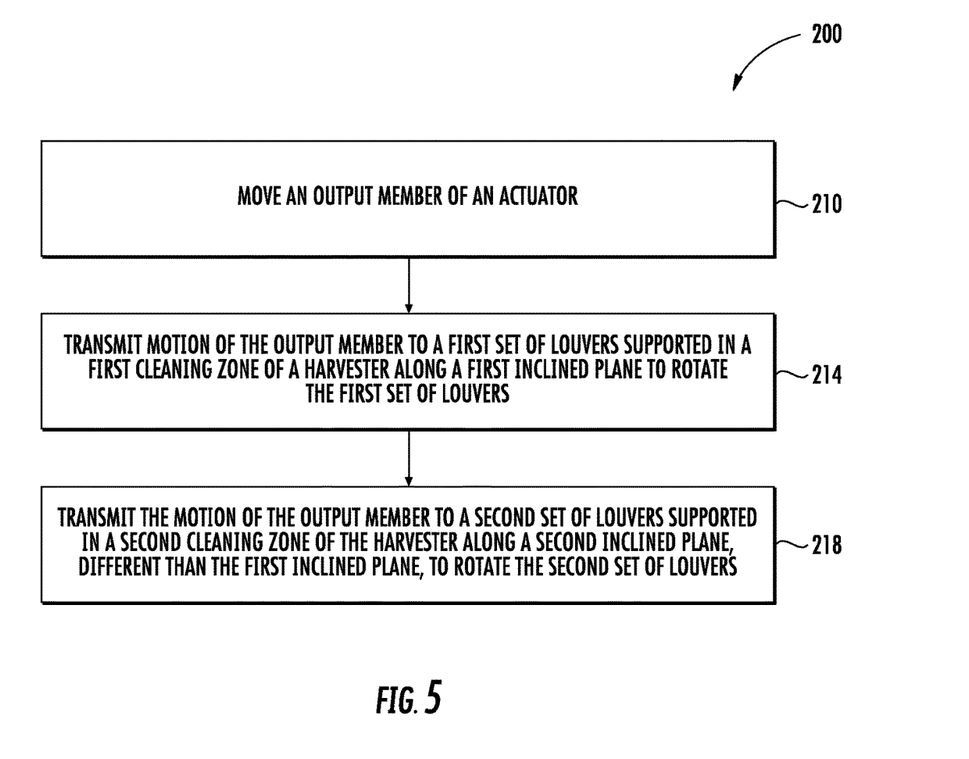
FIG. 5 is a flow diagram of an example method for adjusting louvers in cleaning zones along different inclined planes.

FIG. 5 is a flow diagram of an example method 200 for actuating or adjusting angular orientation of different sets of louvers in different inclined planes. Method 200 is described as carried out with cleaning system 20. It should be appreciated method 200 may also be carried out with any of the cleaning system described hereafter or other similar cleaning systems.

As indicated by block 210, the output member 50 of actuator 30 is moved. As indicated by block 214, the motion of output member 50 is transmitted to set 42 of louvers 46 supported in a first cleaning zone 22 of a harvester along a first inclined plane 32. This results in louvers 46 of set 42 being rotated, such as from the orientation in FIG. 2 to the orientation shown in FIG. 3. As indicated by block 218, the same motion of output member 50 is further transmitted to the second set 44 of louvers 46 supported in the second cleaning zone 24 along a second inclined plane 34. This results in louvers 46 of set 44 also been concurrently rotated, such as from the orientation in FIG. 2 to the orientation shown in FIG. 3. In one implementation, the angular extent at which louvers 46 are rotated is directly proportional to the extent to which output member 50 is moved. In one implementation, louvers 46 of sets 42 and 44 equally change in angular orientation in response to movement of output member 50. In another implementation, as described above regarding cleaning system 120, the louvers 46 of different sets 42, 44 may rotate by different angular extents in response to a given degree or extent of movement of output member 50 of actuator 30.

Figure 6:
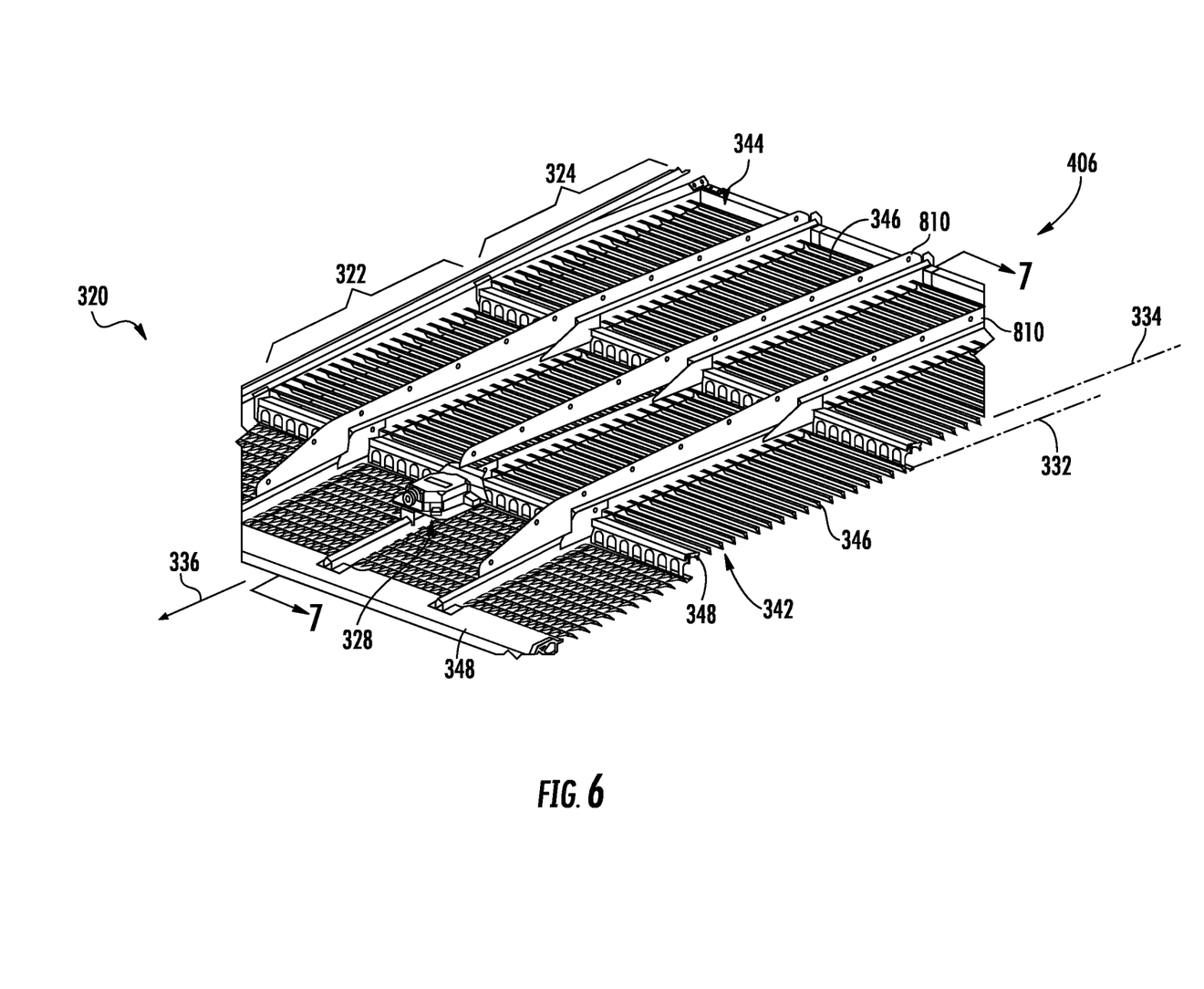
FIG. 6 is a top perspective view of another example harvester cleaning system.

FIGS. 6-10 illustrate harvester cleaning system 320, an example implementation of harvester cleaning system 20. As shown by FIG. 6, harvester cleaning system 320 comprises chaffer or sieve 406 to be supported by other structures of the overall cleaning system 320 and of the harvester supporting sieve 406. For example, one implementation, sieve 406 may comprise an upper sieve or a lower sieve of a cleaning shoe of a harvester. Sieve 406 comprises cleaning zones 322, 324 and louver actuation system 328.

Cleaning zones 322 comprise different sets of louvers extending or contained within different inclined planes 332 and 334 each angled with respect to a horizontal plane. In the example illustrated, planes 332 and 334 are inclined in a rearward direction as indicated by arrow 336. In the example illustrated, planes 332 and 334 are parallel to one another. In other implementations, planes 332 and 334 may have different slopes or inclinations regarding one another regarding the horizontal plane.

Each of cleaning zones 322 and 324 comprises supports 338, 339, sets of louver wires 347 (shown in FIG. 8), and different sets 342 and 344 of louvers 346. Supports 338 rotatably support louver wires 347. Supports 338, 339 of cleaning zone 322 extend along longitudinal axes that are parallel to inclined plane 332. Supports 338, 339 of cleaning zone 324 extend along longitudinal axes that are parallel to inclined plane 334. In the example illustrated, supports 338 of zones 322 and 324 extend end-to-end. In one implementation, supports 338 are themselves supported or suspended by overlying chassis or other structures of the harvester.

Figure 8:
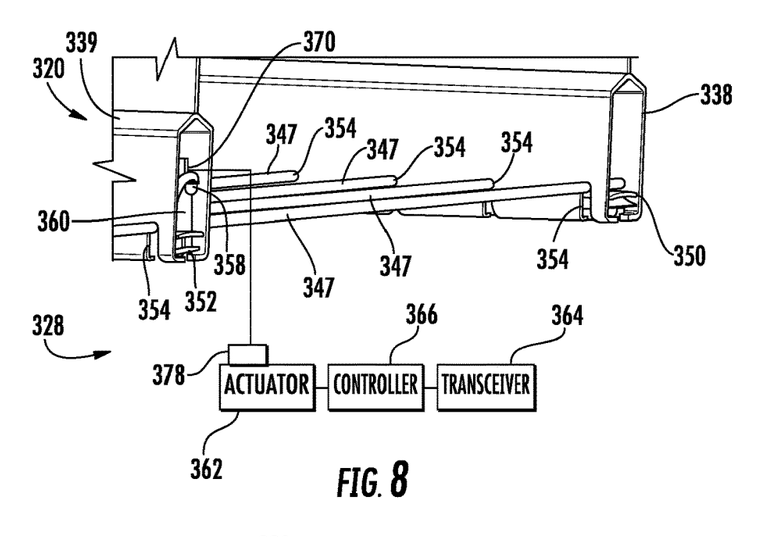
FIG. 8 is an enlarged fragmentary perspective view of a portion of the example harvester cleaning system of FIG. 6.

FIG. 8 illustrates portions of two example supports 338, 339 and the associated louver wires 347 of one of cleaning zones 322, 324. For ease of illustration, the louvers 346 in the example cleaning zone are omitted. Supports 338 rotatably support louver wires 347. Support 339 is similar to support 338, but additionally supports portions of louver actuation system 328. Each of supports 338, 339 comprises a channel member 348, a support plate 350 and a spring 352.

Channel member 348 extends along a longitudinal axis parallel to the corresponding inclined plane 332, 334 cleaning zones 322, 324 in which the channel member 348 is located. Channel member 348 comprises slots 354 which rotatably receive portions of louver wires 347 which extend through and across channel member 348. The plurality of slots 354 are spaced along the length of channel member 348 at longitudinal spacings corresponding to the spacing of louver wires 347.

Support plate 350 extend within channel member 348 and is resiliently biased in an upward direction by spring 352 captured between plate 350 and a bottom floor of channel member 348. In channel member 348 of support 338, support plate 350 underlies and abuts louver wire 347 to retain louver wire 347 against the top of slot 354. In channel member 348 of support 339, support plate 350 underlies and abuts an adjustment arm left from described hereafter) which abuts and underlies an upturned portion of louver wire 347 to retain louver wire 347 against the top of slot 354.

In the example illustrated in FIG. 6, supports 338, 339 each continuously extend longitudinally along and across both of cleaning zones 322, 324, wherein each of supports 338, 339 has an angled portion at the juncture of cleaning zone 322, 324, bridging those portions of support 33, 339 at heights or in different planes. In other implementations, supports 338, 339 may each comprise different portions: a first portion extending in cleaning zone 322 at a second portion, spaced from the first portion, extending along cleaning zone 324.

Louver wires 347 extend between supports 338, 339 and support louvers 346. Louver wires 347 are rotatable about their main axes, the axis of the louver wires extending between consecutive supports 338, 339 so louvers 346 also rotate about the main axes of wires 347. As shown by FIG. 8, each of louver wires 347 has an angular upturned portion 358 within support 339. Upturned portion 358 provides a lever or lever arm by which louver actuation system 328 may apply force to louver wires 347 to pivot or rotate louver wire 347 about their main axis to adjust the angular orientation of the louvers 346 mounted to or otherwise extending from louver wires 347.

Louver actuation system 328 angularly adjusts each of louvers 346 in zones 322, 324 in the different planes 332, 334. Louver actuation system 328 concurrently rotates and angularly adjusts each of louver 346 in both of zones 322, 324. Louver actuation system 328 comprises adjustment arm 360 (shown in FIGS. 7 and 8), actuator 362, transceiver 364 and controller 366.

As shown by FIG. 8, adjustment arm 370 comprise a bar, plate or other elongate structure extending within channel member 339. Adjustment arm 370 includes multiple spaced upwardly facing slots 370 longitudinally spaced at spacings corresponding to the longitudinal spacing of louver wires 347. Each of slot 370 receives the upturned portion 358 of the associated louver wire 347. Adjustment arm 370 is further longitudinally slidable within support 339. Sliding movement of adjustment arm 370 results in louver wires 347 being pivoted or rotated to pivot or rotate the corresponding louvers 346.

Figure 7:
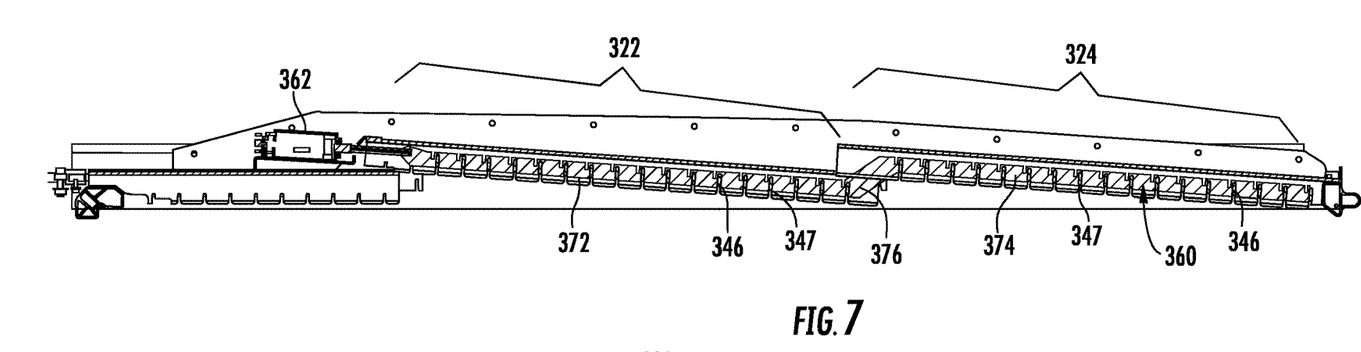
FIG. 7 is a sectional view of the example harvester cleaning system of FIG. 6 taken along line 7-7 of FIG. 6, illustrating an example adjustment arm of an example louver actuation system.

As shown by FIG. 7, adjustment arm 360 extends in a longitudinal direction fully across each of cleaning zone 322 and 324. Sliding movement of adjustment arm 360 concurrently pivots the louver wires 347 and associated louver 346 of both cleaning zones 322 and 324. As further shown by FIG. 7, adjustment arm 360 comprises a first portion 372, a second portion 374 and a connector portion 376. First portion 372 extends along cleaning zone 322, being centered along a longitudinal axis that extends parallel to the inclined plane 332 which contains louver wires 347 of cleaning zone 322. Second portion 374 extends along cleaning zone 324, being centered along a longitudinal axis that extends parallel to the inclined plane 334 contains louver wire 347 of cleaning zone 324. Connector portion 376 connects portions 372 and 374. In the example illustrated, connector portion 376 angles upwardly, in a forward direction, from portion 372 to portion 374.

Figure 7A:
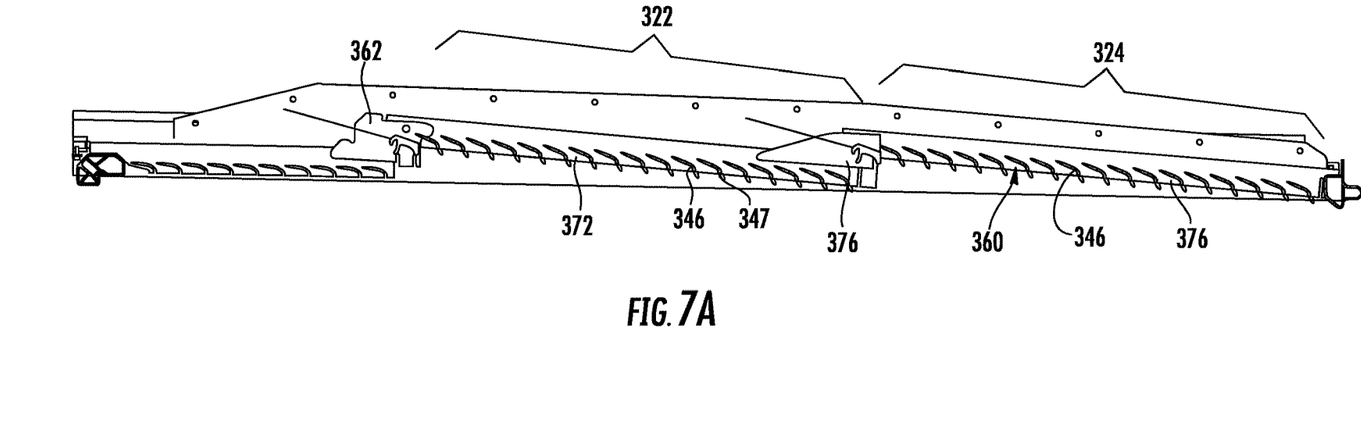
FIG. 7A is a sectional view of the example harvester cleaning system of FIG. 6 taken along line 7-7 of FIG. 6, illustrating another example adjustment arm of an example louver actuation system.

In the example illustrated, connector portion 376 is integrally formed as a single unitary body with portions 372 and 374 so adjustment arm 360 comprises a single continuous unitary body or bar. As shown by FIG. 7A, in another implementation, portions 372 and 374 may be separate bars, wherein connector portion 376 comprises a connection plate or other structure mounted to at least one of portions 372, 374 to connect portions 372 and 374 in their different respective planes. In one implementation, connector portion 376 is connected at one end to portion 372 and at another end to portion 374. In another implementation, connector portion 376 is integrally formed as part of a single unitary body with one of portions 372, 374 while being connected or mounted to the other of portions 372, 374.

Actuator 362 comprises a linear actuator having an output member 378 which is operably coupled to adjustment arm 370. Actuation of actuator 362 linearly moves output member 378, wherein the linear movement of output member 378 is transmitted to adjustment arm 370 to slide adjustment arm 370 in a longitudinal direction within channel member 339, pivoting or rotating louver wires 347 and louver 346 in both of zone 322, 324. Actuator 362 may comprise a linear actuator such as a hydraulic or pneumatic piston-cylinder assembly, an electric solenoid or other devices that produce linear movement of an output member 378. In some implementations, actuator 362 may comprise a rotary actuator, wherein the rotational motion is converted to linear motion while being transmitted to adjustment arm 370.

Transceiver 364 comprises a communication device that facilitates communication between controller 366 and a remote transceiver, such as a transceiver, proximate to a cab of the harvester. Transceiver 364 facilitates the transmission of commands, inputs or selections from a remote location, such as from a cab or control counsel associated with the harvester. In one implementation, transceiver 364 further facilitates the transmission of sensor signals indicating various operational states of other components of the harvester, environmental conditions or characteristics of the grain or crop being harvested. In one implementation, transceiver 364 comprises a wireless transceiver, facilitating the wireless transmission of such controller data signals. In some implementations, transceiver 950 may comprise a wired transceiver or may be omitted.

Controller 366 comprises electronics that control the operation of actuator 362. In one implementation, controller 366 comprises an integrated circuit, such as an application-specific integrated circuit that carries out logic in controlling actuator 362 to change the angular positioning orientation of louvers 346. In one implementation, controller 366 comprises computer hardware, such as a processing unit and associated instructions stored in a non-transitory computerize readable medium, wherein the instructions direct the processing unit to output control signals to actuator 362, causing actuator 362 to linearly move adjustment arm 370 to adjust the angular orientation of louvers 346.

Figure 9:
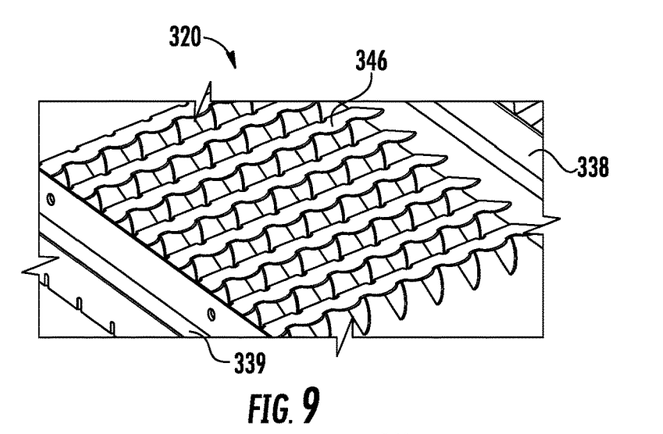
FIG. 9 is an enlarged fragmentary perspective view of a portion of the example harvester cleaning system of FIG. 6, illustrating louvers in a first angular position.
Figure 10:
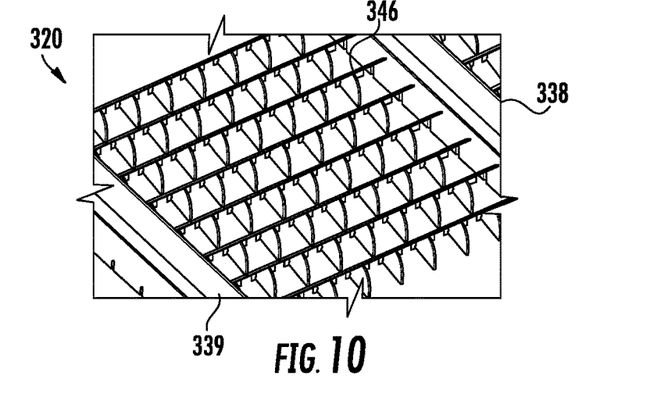
FIG. 10 is an enlarged fragmentary perspective view of the portion of the example harvester cleaning system of FIG. 9, illustrating the louvers in a second angular position.

FIGS. 9 and 10 illustrate the angular adjustment of example louvers by actuation system 328. In one implementation, the remote transceiver, such as from the cab of a harvester or from a remote harvester controller, transmits signals to transceiver 364 instructing a change in the angular orientation or position of louver 346. Such instructions are relayed to controller 366. In response to such instructions, controller 366 actuates actuator 362, causing actuator 362 to move in output member 378 and transmit force to adjustment arm 370. Adjustment arm 370 slides within channel member 339 to transmit the motion of output member 378 to each of louver wires 347, pivoting louver wires 347 in both of cleaning zones 322, 324 in the respective different inclined planes 332, 324. As a result, louvers 346 are rotated from the first angular position in FIG. 9 to the second angular position shown in FIG. 10.

Figure 11:
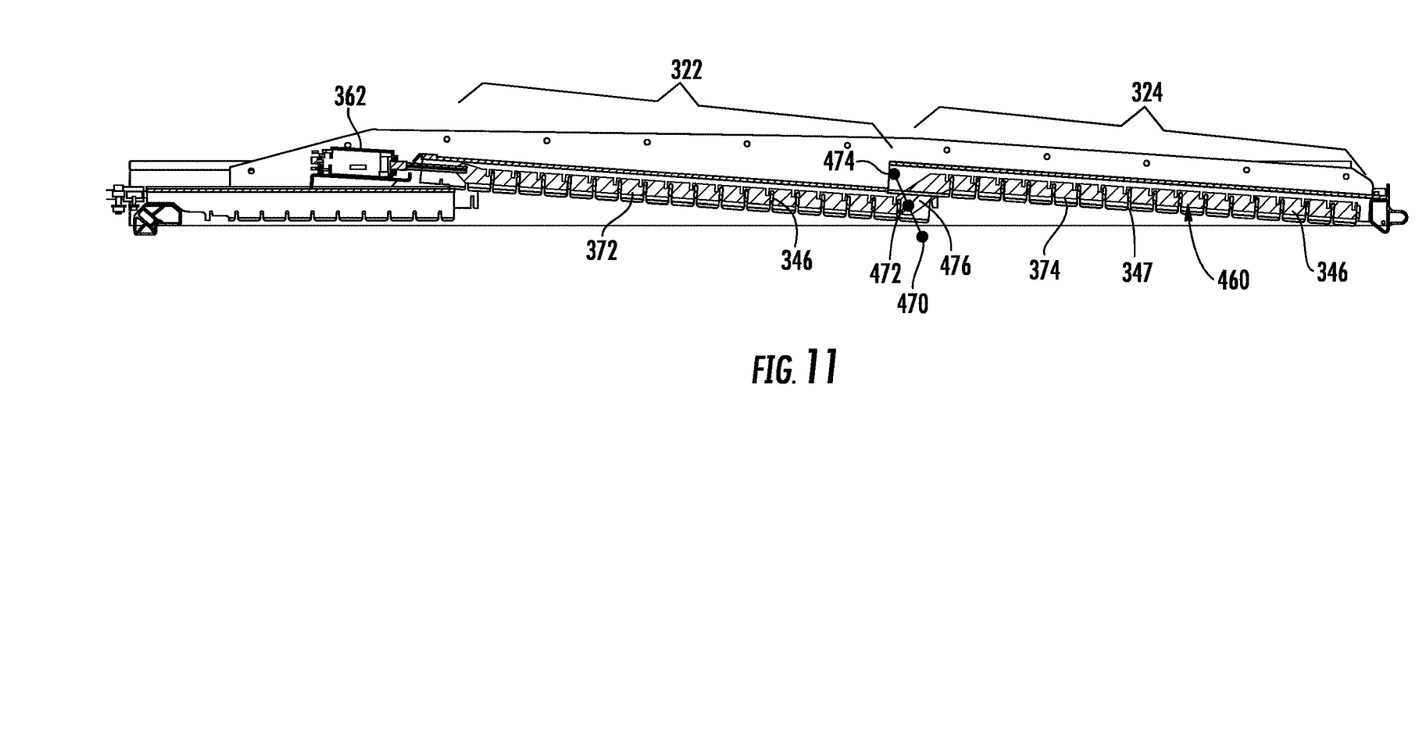
FIG. 11 is a sectional view of another example harvester cleaning system take along line 7-7 of FIG. 6, illustrating another example adjustment arm of an example louver actuation system.

FIG. 11 illustrates harvester cleaning system 420, an example implementation of harvester cleaning system 120. Cleaning system 420 is similar to cleaning system 320 except that cleaning system 420 comprises adjustment arm 460 in lieu of adjustment arm 360. Those remaining components of cleaning system 420 which correspond to components of cleaning system 320 are numbered similarly.

Adjustment arm 460 facilitates non-uniform or different angular rotation of the louver wires 347 and associated louvers 346 in the cleaning zones 322, 324. Adjustment arm 460 is similar to adjustment arm 360 except that portions 372 and 374 are slidable or otherwise movable relative to one another and that adjustment arm 460 comprises connector portion 476 in lieu of connector portion 376. Connector portion 476 comprise a linkage pivotably connected to a frame or other supporting structure for rotation about pivot axis 470. Connector portion 476 is pivotally connected to first portion 372 at pivot connection 472 and is pivotally connected to second portion 374 at pivot connection 474.

Because pivot connection 472 is closer to pivot axis 470 as compared to pivot connection 474, linear translation of first portion 372 by a first linear distance by actuator 372 causes linear translation of second portion 374 by a second linear distance greater than the first linear distance. This results in the louver wires 347 and associated louvers 346 of cleaning zones 322 and 324 being differently rotated in response to actuation by actuator 362. In other words, rotation of the louver wires 347 and associated louvers 346 by a first angular extent in response to movement of portion 372 of adjustment arm 460 by actuator 362 concurrently results in rotation of the louver wire 347 and associated louvers 346 in cleaning zone 324 by a greater angular extent.

In other implementations, this relationship may be reversed by alternatively locating pivot axis 470 at the other end of the linkage forming connection portion 472 such that pivot connection 474 is closer to the pivot axis 470 as compared to pivot connection 476. The difference in the extents of angular rotation in the different cleaning zones may be controlled or varied by adjusting the relative proximities of pivot connections 472 and 474 relative to pivot axis 470. In yet other implementations, other mechanisms may be utilized to connect portions 372 and 374 of adjustment arm 460 such that the louver wires 347 and associated louvers 346 in the different cleaning zones angularly rotate by different extents in response to linear actuation by actuator 362.

Figure 12:
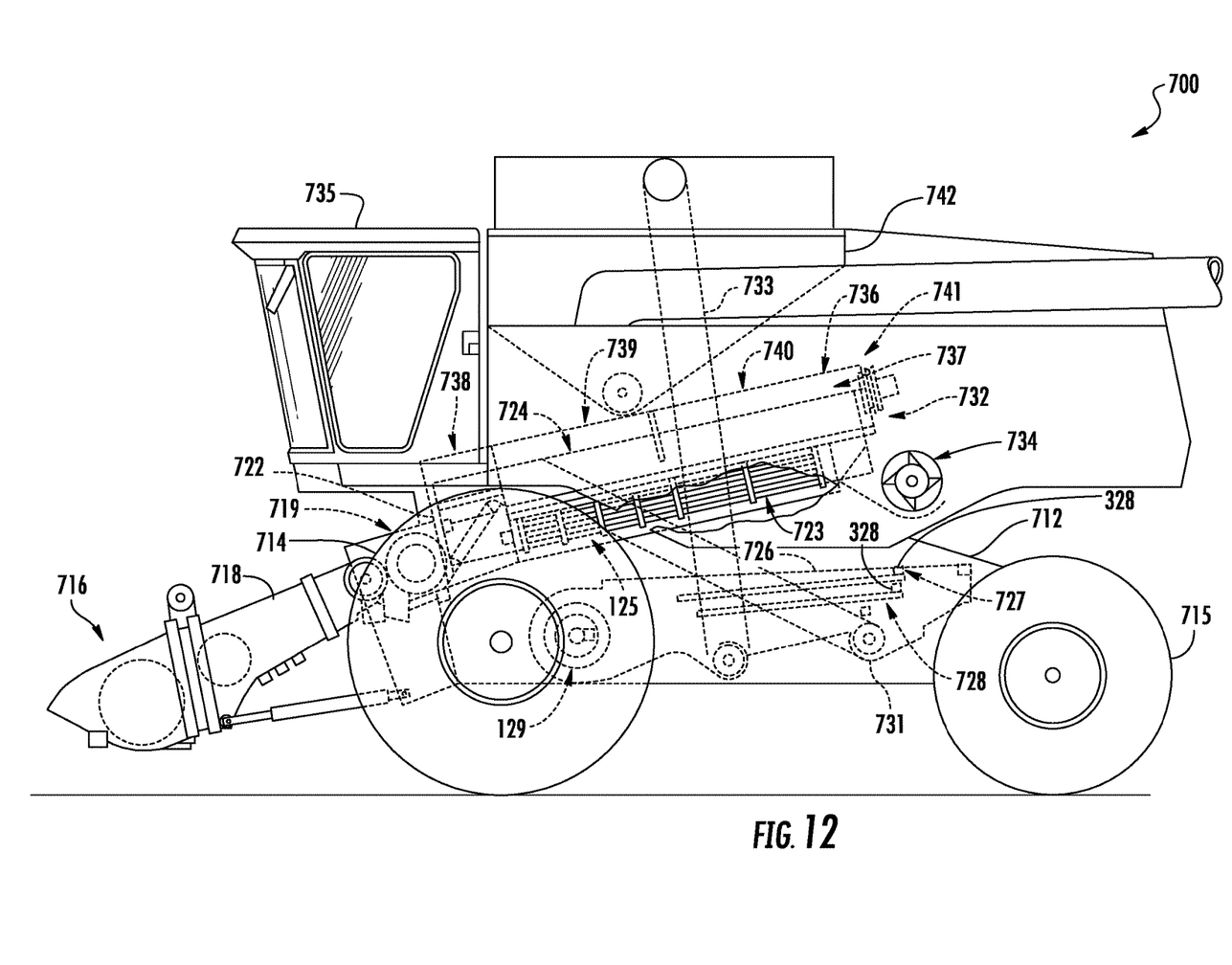
FIG. 12 is a side elevational view of an example harvester incorporating the example harvester cleaning system of FIG. 6.
Figure 13:
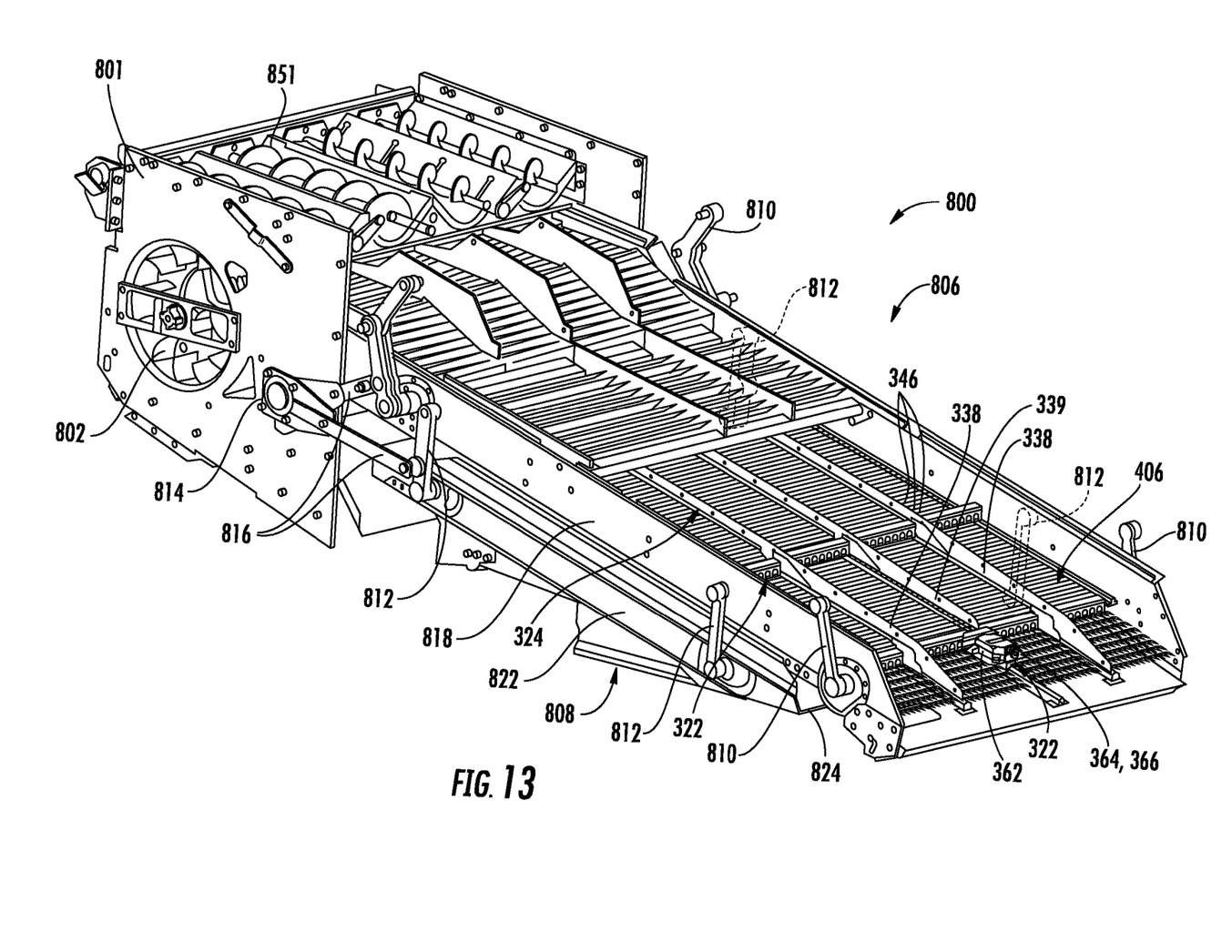
FIG. 13 is a rear perspective view of an example cleaning shoe of the harvester of FIG. 12 incorporating the example harvester cleaning system of FIG. 6.

FIGS. 12 and 13 illustrate an example harvester 700 having an example cleaning shoe 800, wherein the cleaning shoe 800 incorporates the sieve 406 described above. As shown by FIG. 12, harvester 700 comprises a main frame 712 having wheel structure including front and rear ground engaging wheels 714 and 715 supporting the main frame for forward movement over a field of crop to be harvested. The front wheels 714 are driven by an electronically controlled hydrostatic transmission.

A vertically adjustable header or harvesting platform 716 is used for harvesting a crop and directing it to a feeder house 718. The feeder house 718 is pivotally connected to the frame 712 and includes a conveyor for conveying the harvested crop to a beater 719. The beater 719 directs the crop upwardly through an inlet transition section 722 to a rotary cleaning and separating assembly 724. In other implementations, other orientations and types of cleaning structures and other types of headers 716, such as transverse frame supporting individual row units, are utilized.

The rotary cleaning and separating assembly 724 threshes and separates the harvested crop material. Grain and chaff fall through a concave 725 and separation grates 723 on the bottom of the assembly 724 to a cleaning system 726, and are cleaned by a chaffer 727, sieve 728 and air fan 729. The cleaning system 726 removes the chaff and directs the clean grain to elevator 733. Clean grain elevator 733 conveys the grain to tank 742. The clean grain in the tank 742 can be unloaded into a grain cart or truck by unloading auger. Tailings fall into the return elevator or auger 731 and are conveyed to the rotor 737 where they are threshed a second time.

Threshed and separated straw is discharged from the rotary cleaning and separating assembly 724 through an outlet 732 to a discharge beater 734. The discharge beater 734, in turn, propels the straw out the rear of the combine. The discharge beater 734 could also discharge crop material other than grain directly to a straw chopper. The operation of the combine is controlled from an operator's cab 735.

In the example illustrated, the rotary cleaning and separating assembly 724 comprises a cylindrical rotor housing 736 and a rotor 737 located inside the housing 736. The front part of the rotor and the rotor housing define the infeed section 738. Downstream from the infeed section 738 are the cleaning section 739, the separating section 740 and the discharge section 741. The rotor 737 in the infeed section 738 is provided with a conical rotor drum having helical infeed elements for engaging harvested crop material received from the beater 719 and inlet transition section 722.

In the cleaning section 739, the rotor 737 comprises a cylindrical rotor drum having a number of cleaning elements, sometimes called rasping bars, for cleaning the harvested crop material received from the infeed section 738. Downstream from the cleaning section 739 is the separating section 740 wherein the grain trapped in the threshed crop material is released and falls to the cleaning system 728.

FIG. 13 is a perspective view of the example cleaning shoe 800 of cleaning system 726. Cleaning shoe 800 comprises housing 801, a fan 802, a housing 804, an upper sieve assembly 806, a lower sieve assembly 808, hangers 810, hangers 812, a motor 814, and a drive crank 816. Housing 801 comprise a structure that supports fan 802 and motor 814. Fan 802 extends laterally across substantially the entire width of the cleaning shoe. Fan 802 generates an airflow that travels rearward toward the upper sieve assembly 806 and the lower sieve assembly 808. This air is conveyed upward through the upper sieve assembly 806 and the lower sieve assembly 808, levitating material other than grain such as straw and chaff and carries the straw and chaff rearward and out of the agricultural harvester.

The upper sieve assembly 806 comprises a frame 818 generally rectangular and the upper sieve 406 supported in the frame 818. The lower sieve assembly 808 comprises a frame 822 and a lower sieve 824 supported in the frame 822.

Each hanger 810 has an upper end and a lower end. The upper end is pivotally coupled to the chassis (not shown) of the agricultural harvester. The lower end is pivotally coupled to the upper sieve assembly 806. By this arrangement, the upper sieve assembly 806 is suspended to pivot or reciprocate generally fore and aft in response to reciprocating motion provided by motor 814 and crank 816. In one implementation, motor 814 rotatably drive crank 816 at a speed of between 260 and 320 revolutions per minute. The hangers 810 are disposed in a generally rectangular arrangement, to support the left front, left rear, right front, and right rear of the upper sieve assembly 806. The hangers 810 are disposed at and support the upper sieve assembly 806 at the four corners of the upper sieve assembly 806 disposed at and support the upper sieve assembly 806 at the four corners of the upper sieve assembly 806.

Each hanger 812 has an upper end and a lower end. The upper end is pivotally coupled to the chassis (not shown) of the agricultural harvester. The lower end is pivotally coupled to the lower sieve assembly 808. By this arrangement, the upper sieve assembly 806 is suspended to pivot and reciprocate generally fore-and-aft. The hangers 812 are disposed in a generally rectangular arrangement to support the left front, left rear, right front, and right rear of the lower sieve assembly. The hangers 812 are disposed at and support the lower sieve assembly 808 at the four corners of the lower sieve assembly 808.

Although the present disclosure has been described referring to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described referring to the example implementations and set forth in the following claims is manifestly intended to be as broad as possible. For example, unless specifically otherwise noted, the claims reciting a single particular element also encompass a plurality of such particular elements.

What is claimed is:

1. A harvester cleaning system comprising:
    a first cleaning zone extending in a first inclined plane, the first cleaning zone comprising a first set of louvers;
    a second cleaning zone extending in a second inclined plane different than the first inclined plane, the second cleaning zone comprising a second set of louvers; and
    a single actuator operably coupled to the first set of louvers and the second set of louvers so as to concurrently rotate both the first set of louvers and the second set of louvers, wherein the actuator comprises a linear actuator, a first set of louver wires coupled to the first set of louvers;

a second set of louver wires coupled to the second set of louvers; and an adjustment arm having slots receiving the first set of louver wires and the second set of louver wires, the adjustment arm being operably coupled to the single actuator to be reciprocated by the single actuator to concurrently rotate the first set of louvers and the second set of louvers, wherein the adjustment arm comprises a first portion extending parallel to the first inclined plane, a second portion extending parallel to the second inclined plane and an intermediate portion connecting the first portion to the second portion.

2. The harvester cleaning system of claim 1, wherein rotation of the first set of louvers in response to actuation of the single actuator is proportional to rotation of the second set of louvers in response to the same actuation of the single actuator.

3. The harvester cleaning system of claim 2, wherein the first set of louvers rotate by an angular extent in response to actuation of the single actuator and wherein the second set of louvers rotate by the angular extent in response to the same actuation of the single actuator.

4. The harvester cleaning system of claim 1, wherein the first set of louvers rotate by a first angular extent in response to actuation of the single actuator and wherein the second set of louvers rotate by a second angular extent, different than the first angular extent, in response to the same actuation of the single actuator.

5. The harvester cleaning system of claim 1, wherein the first set of louvers and the second set of louvers remain in the first inclined plane and the second inclined plane, respectively, during rotation of the first set of louvers and the second set of louvers by the single actuator.

6. A method comprising:
moving an output member of an actuator;
transmitting motion of the output member to a first set of louvers supported in a first cleaning zone of a harvester along a first inclined plane to rotate the first set of louvers; and
transmitting the motion of the output member to a second set of louvers supported in a second cleaning zone of the harvester along a second inclined plane, different than the first inclined plane, to rotate the second set of louvers, wherein rotation of the first set of louvers in response to actuation of the actuator is proportional to rotation of the second set of louvers in response to the same actuation of the actuator, wherein the first set of louvers rotate by a first angular extent in response to an actuation of the actuator and wherein the second set of louvers rotate by a second angular extent, different than the first angular extent, in response to the actuation of the actuator.

7. The method of claim 6, wherein the actuator comprises a linear actuator, wherein the motion is transmitted by at least one adjustment arm which is operably coupled to and which linearly moves to rotate first and second set of louver wires to rotate the first set of louvers and the second set of louvers, respectively.

8. The method of claim 7, wherein the at least one adjustment arm comprises a first portion extending parallel to the first inclined plane, a second portion extending parallel to the second inclined plane and an intermediate portion connecting the first portion to the second portion.

9. The method of claim 7, wherein the at least one adjustment arm comprises:
a first adjustment arm having slots receiving a first set of louver wires connected to the first set of louvers, the first adjustment arm being connected to the actuator;
a second adjustment arm having slots receiving a second set of louvers connected to the second set of louvers; and
a connector connecting the first adjustment arm and the second adjustment arm, wherein the second adjustment arm moves in response to movement of the first adjustment arm, wherein the motion is transmitted by the first adjustment arm and the first set of louver wires to the first set of louvers to rotate the first set of louvers and wherein the motion is transmitted by the first adjustment arm, the connector, the second adjustment arm and the second set of louver wires to the second set of louvers to rotate the second set of louvers.

10. A harvester comprising:
a head to separate crop from a growing medium;
a threshing mechanism to thresh the crop;
a cleaning shoe to clean the threshed crop, the cleaning shoe comprising:
a first cleaning zone extending in a first inclined plane, the first cleaning zone comprising a first set of louvers;
a second cleaning zone extending in a second inclined plane different than the first inclined plane, the second cleaning zone comprising a second set of louvers;
a reciprocating drive to reciprocate the first cleaning zone with the first set of louvers and the second cleaning zone with the second set of louvers;
a first set of louver wires coupled to the first set of louvers;
a second set of louver wires coupled to the second set of louvers;
at least one adjustment arm having slots receiving the first set of louver wires and the second set of louvers; and
a linear actuator operably coupled to the at least one adjustment arm, wherein the linear actuator concurrently moves the at least one adjustment arm to concurrently rotate the first set of louver wires and the second set of louver wires to concurrently rotate the first set of louvers and the second set of louvers, wherein the at least one adjustment arm comprises a single adjustment arm comprising a first portion extending parallel to the first inclined plane, a second portion extending parallel to the second inclined plane and an intermediate portion connecting the first portion to the second portion.

11. The harvester cleaning system of claim 1, wherein the second inclined plane is parallel to the first inclined plane.

12. The harvester cleaning system of claim 1, wherein the intermediate portion extends upwardly from the first inclined plane to the second inclined plane.

13. The harvester cleaning system of claim 1, wherein the intermediate portion is pivotally connected to a supporting structure about a first pivot axis, is pivotably connected to the first portion about a second pivot axis and is pivotably connected to the second portion about a third pivot axis.

14. The method of claim 6, wherein the second inclined plane is parallel to the first inclined plane.

15. The method of claim 6, wherein the motion is transmitted by a connector portion extending upwardly from the first set of louvers to the second set of louvers.

16. The method of claim 6, wherein the motion is transmitted from the first set of louvers to the second set of louvers by a connector portion pivotably supported about a first axis, pivotally connected to the first set of louvers about a second axis offset from the first axis and pivotably connected to the second set of louvers about a third axis offset from the first axis and the second axis.

17. The harvester of claim 10, wherein the second inclined plane is parallel to the first inclined plane.

18. The harvester claim 10, wherein the intermediate portion extends upwardly from the first inclined plane to the second inclined plane.

19. The harvester of claim 10, wherein the intermediate portion is pivotally connected to a supporting structure about a first pivot axis, is pivotably connected to the first portion about a second pivot axis and is pivotably connected to the second portion about a third pivot axis.

\* \* \* \* \*